Figure 1:
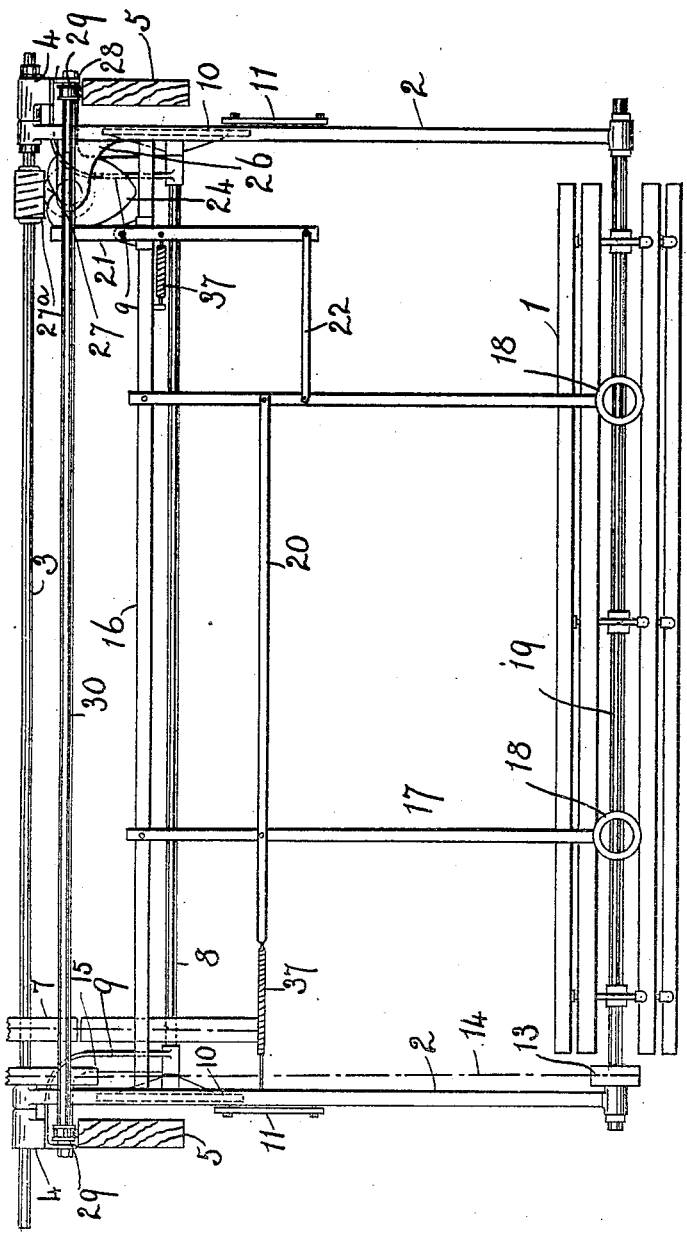

J. W. BANKS.
APPARATUS FOR PILING PIECE GOODS.
APPLICATION FILED AUG. 29, 1908.

958,579.

Patented May 17, 1910.
3 SHEETS—SHEET 1.

WITNESSES

INVENTOR
James William Banks
By
Attorney

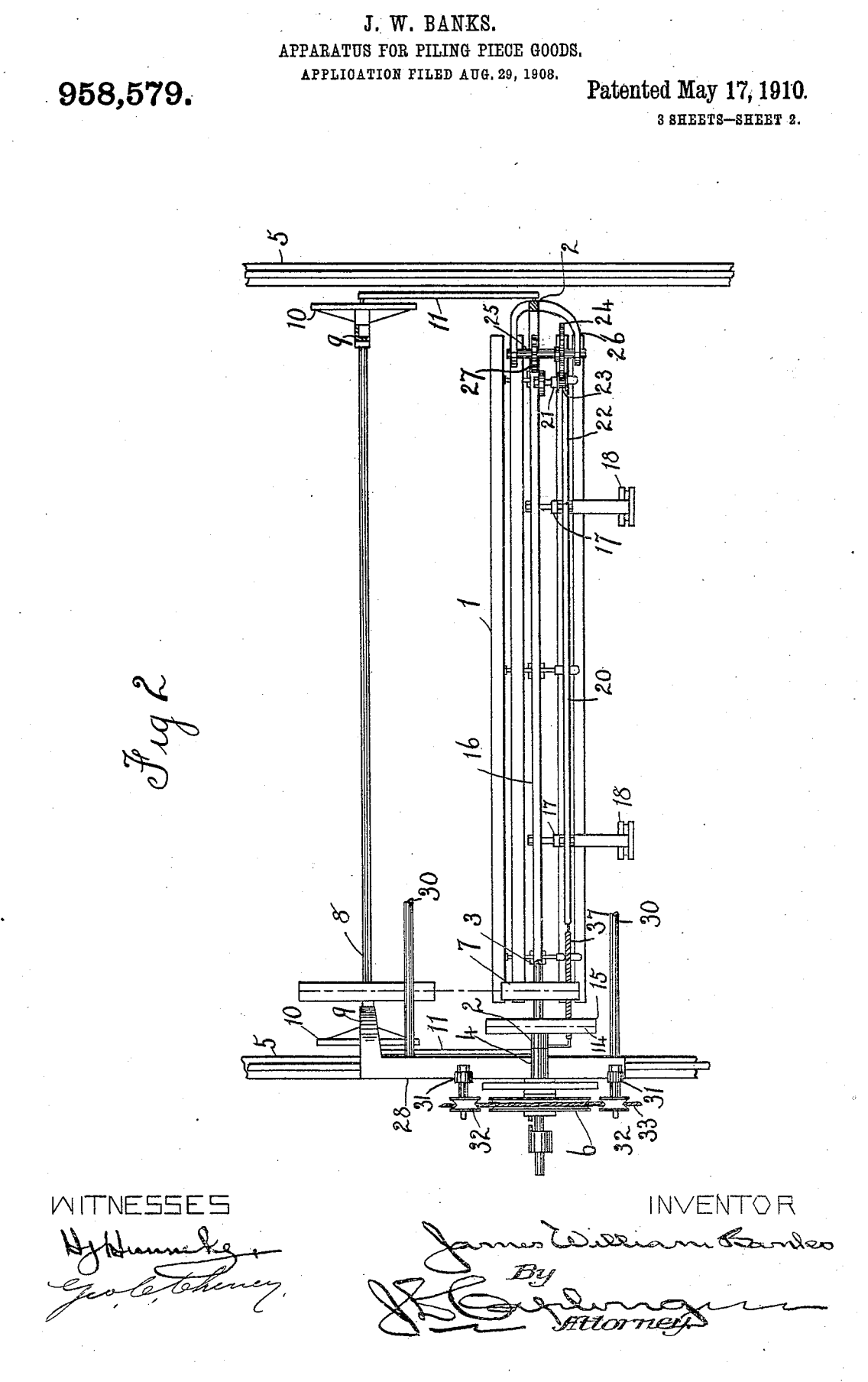

J. W. BANKS.
APPARATUS FOR PILING PIECE GOODS.
APPLICATION FILED AUG. 29, 1908.

958,579.

Patented May 17, 1910.
3 SHEETS—SHEET 2.

Fig 2

WITNESSES

INVENTOR

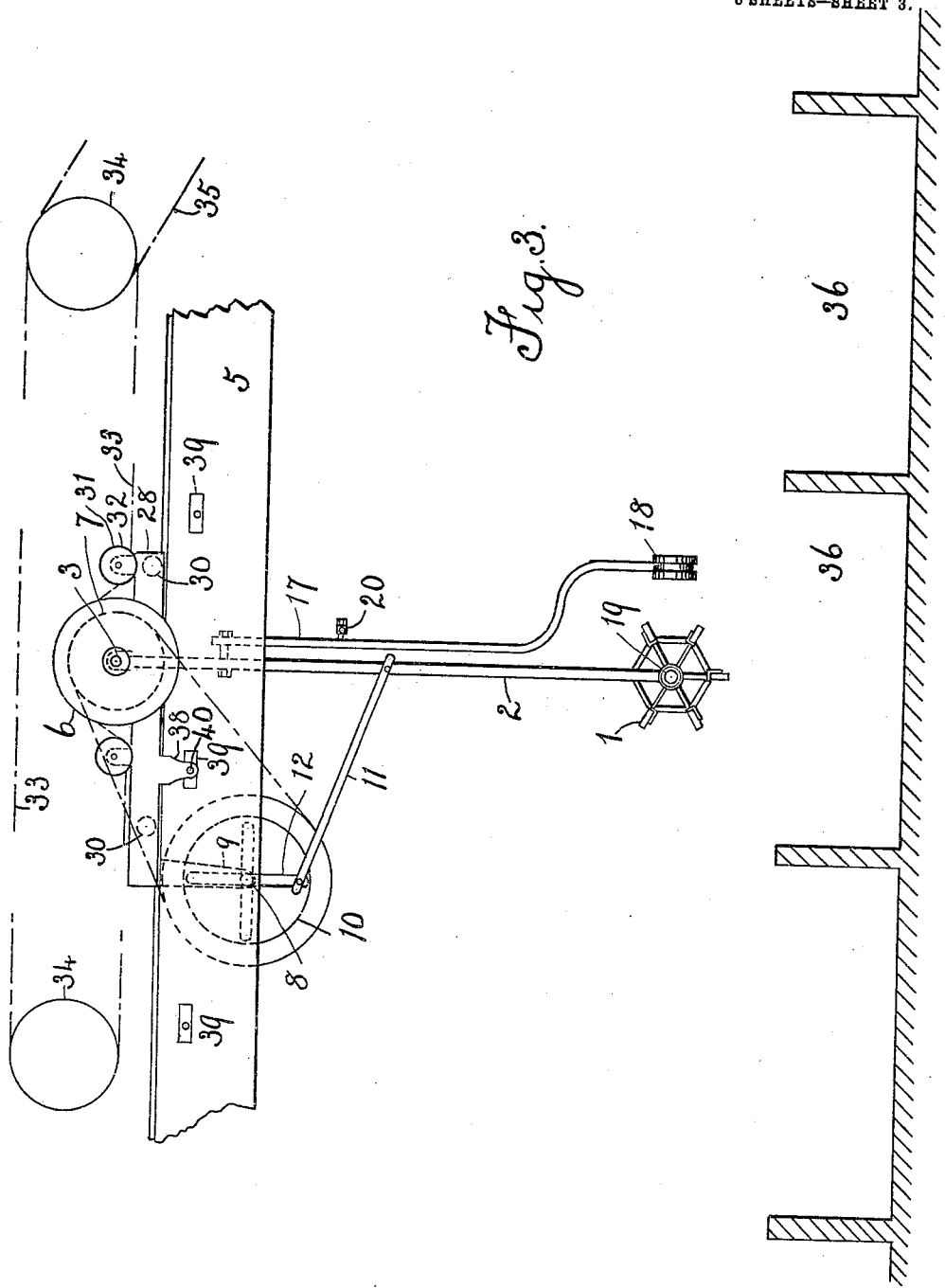

UNITED STATES PATENT OFFICE.

JAMES WILLIAM BANKS, OF BRADFORD, ENGLAND, ASSIGNOR OF TWO-THIRDS TO THE FIRM OF DENISON, PREUSSNER AND COMPANY, OF BRADFORD, ENGLAND.

APPARATUS FOR PILING PIECE GOODS.

958,579. Specification of Letters Patent. Patented May 17, 1910.

Application filed August 29, 1908. Serial No. 450,908.

*To all whom it may concern:*

Be it known that I, JAMES WILLIAM BANKS, a subject of the King of Great Britain, engineer, residing at Bradford, Yorkshire, England, have invented new and useful Improvements in Apparatus for Piling Piece Goods in Rope Form, Yarns, Warps, and the Like, of which the following is a specification.

This invention relates to improved apparatus for piling piece goods in rope form, warps, yarns and the like which have passed lengthwise through machines in which they have been treated, for the purpose of bleaching, dyeing and the like.

The object of the invention is to provide an improved apparatus in which the piece goods or the like as they are fed over a roller winch or the like, are given, in addition to a to and fro motion, a traversing motion at right angles to the to and fro motion.

By the present invention the piece goods or the like are fed in any suitable manner from the usual keir by a winch or the like to a rotating and swinging or oscillating winch having a motion at right angles to its length. In connection with this oscillating winch and secured to the frame of the same, are pot eyes or guides through which the piece goods pass before reaching the winch, these pot eyes or guides are mounted on depending brackets which are given an oscillating or reciprocating motion parallel to the length of the winch.

In order that the invention may be fully understood reference will now be had to the accompanying drawings in which—

Figure 1 is a front elevation of the device. Fig. 2 a plan view of the same showing the driving gear omitted from Fig. 1 and Fig. 3 an end view looking at the left-hand end of Fig. 2.

In these drawings the rotating winch 1 is mounted on depending swinging brackets 2, themselves mounted on a rotating main shaft 3 bearing in suitable bearings or brackets 4 supported by suitably arranged girders or beams 5. This main shaft 3 carries a driving pulley 6, and a second pulley 7 whereby its motion can be communicated to a second shaft 8 bearing in the brackets 9 mounted on the girders or beams 5, this second shaft carries disks 10 or cranks keyed thereto which by means of connecting rods 11 are connected to the depending winch brackets 2, so that the rotation of the disks 10 communicates an oscillating motion to the winch 1. The disks 10 may if desired be slotted as at 12, so that the connection with the connecting rods 11, may be adjusted toward or away from the center whereby the throw of the connecting rod can also be adjusted. The winch is rotated by a suitable pulley 13 connected by belt or other gearing 14 to a similar pulley 15 on the main shaft 3.

The depending winch brackets 2 are provided with horizontal cross stays or rods 16, and on the upper of these depending brackets 17, carrying pot eyes 18 at their extremities, are pivotally mounted. The pot eyes 18, are located on about a level with the axis 19 of the winch 1. These last brackets 17 are interconnected by a suitably mounted link 20. Also mounted on the cross stay 16 is a lever 21 connected by a link 22, to one of the depending pot eye brackets 17. The lever 21 carries at its upper end a roller 23 shown in Fig. 2, which is engaged or acted on by a cam 24 mounted on the shaft 25 which latter bears in brackets 26 connected to one of the swing depending brackets 2. The shaft 25 carries a worm wheel 27 which gears with a worm 27$^a$ on the main shaft 3, the arrangement of the parts being such that the shaft 25 is continuously turned and that the cam 24 is caused to operate continuously upon the lever 21, to swing the same pivotally, and thereby to impart oscillatory movement to the pot-eye supporting means in the direction parallel with the winch axis. Springs 37 are arranged which tend to keep the pot eyes to the extreme left and so operate as to return the same from the extreme right whither they have been forced by the cam 24. The depending brackets 9 carrying the shaft 8 are made integral with traveling carriages 28 (one of which is removed for clearness from Fig. 2) which carriages 28 travel along the girders 5 on wheels or rollers 29 mounted on shaft 30. The left hand of these carriages 28 carries the bearings 4 for the main shaft, together with bearings 31 for the guide pulleys 32. The driving belt, chain or rope 33 is passed over two pulleys 34 indicated in Fig. 3, under the guide pulleys 32 and over the main driving pulley 6. One of the pulleys 34 is driven from any suitable place by a rope chain or the like 35. Depending brackets 38 are arranged on the carriages 28 having holes therein corresponding to holes in plates 39 secured to the beams 5.

As will be seen from the foregoing description the main shaft 3 carries the winch 1, which is rotated by the belt or other gearing 14 therefrom, while it is given an oscillating motion from the second shaft 8, at the same time the pot eyes 18 are given an oscillating motion parallel to the axis of the winch 1 by means of the worm $27^a$, cam 24 and link 22, so that the material fed through the pot eyes and over the winch will be fed to and fro at right angles to the winch, and the same traversed to and fro lengthwise of the winch, so that the goods will be satisfactorily piled in the pits 36. As the shafts 3 and 8, and the rest of the apparatus are in the carriage 28 capable of being traveled along its bearing or supporting bearers or guides 5, the apparatus can be located over the different sets of pits 36 to be filled, being locked in position by pins or bolts 40 passed through the holes in the brackets 38 and plates 39.

I declare that what I claim is—

1. In apparatus for piling piece goods in rope form, warps, yarns and the like, a rotating winch having an oscillating motion at right angles to its axis, and pot eyes connected for oscillatory movement in unison with said winch and capable of movement parallel with the axis of said winch.

2. In apparatus for piling piece goods in rope form, warps, yarns and the like, a rotating winch, depending swinging supporting means for said winch, means for oscillating said winch supporting means at right angles to the axis of said winch, pot eyes, swinging depending brackets carrying said pot eyes and mounted on said winch supporting means, and means for oscillating said pot-eye carrying brackets parallel with the axis of the said winch.

3. In apparatus for piling piece goods in rope form, warps, yarns and the like, a main shaft, means for rotating said main shaft, depending brackets capable of oscillating on said main shaft, a winch carried by said brackets, driving means between said main shaft and said winch, further depending brackets mounted on said first-named brackets and capable of oscillating parallel to said main shaft in combination with connections to said main shaft for oscillating said further brackets.

4. In apparatus for piling piece goods in rope form, warps, yarns and the like, a winch, depending brackets carrying said winch, a main shaft supporting said brackets, a second shaft, means for rotating said second shaft from said main shaft, a crank device on said second shaft a link between said crank device and said depending brackets, pot eyes, depending brackets carrying said pot eyes and mounted on said winch carrying brackets and means for oscillating said pot eyes parallel with the axis of the said winch.

5. In apparatus for piling piece goods in rope form, warps, yarns and the like, a winch, depending brackets carrying said winch, a main shaft carrying said brackets, a second shaft, means for rotating said second shaft from said main shaft, a crank device on said second shaft, a link between said crank device and said depending brackets, pot eyes, brackets carrying said pot eyes and mounted on said winch carrying brackets, a link between the pot eye brackets, a further link connected to one of the said pot eye brackets, a lever connected to said further link and mounted on the winch depending brackets, a rotating cam acting on said lever and means on the main shaft for rotating said cam.

6. In apparatus for piling piece goods in rope form, warps, yarns and the like, a winch, oscillating depending brackets supporting said winch, a shaft supporting said depending brackets, a cross-stay on said depending brackets, further depending brackets mounted on said cross-stay, pot eyes carried by said further depending brackets, a cam mounted on said first depending brackets, connections between one of said further depending brackets and said cam for transmitting motion of the cam thereto, means for actuating said cam, and springs between said first and further depending brackets.

7. In apparatus for piling piece goods in rope form, warps, yarns and the like, depending brackets, a rotating winch carried thereby and having an oscillating motion at right angles to its axis, pot eyes connected for oscillatory movement in unison with said winch, and having a further oscillating motion parallel to the axis of the said winch, carriages supporting said winch carrying brackets and means for traveling said carriages in a direction at right angles to the axis of said winch.

8. In apparatus for piling piece goods in rope form, warps, yarns and the like, supporting beams or girders carriages on said beams or girders, a main shaft bearing in said carriages, a rotating winch, depending brackets supporting said winch, pot eyes, means connected with said main shaft for rotating said winch for oscillating said winch and pot eyes at right angles to the axis of the winch and for traveling said pot eyes longitudinally of said winch.

9. In apparatus for piling piece goods in rope form, warps, yarns and the like, supporting beams or girders, carriages on said beams or girders, a main shaft bearing in said carriages, rollers supporting said carriages on said beams or girders, a pulley on said main shaft, guide pulleys on said carriages, driving means passing under said guide pulleys and over said pulley on the main shaft, means for supporting and driving said driving means, means for locking said carriages in different positions on said beams or girders, a winch parallel with and depending from said main shaft, means for rotating said winch, a second shaft driven from said main shaft, means on said second shaft and connected with said winch for giving said winch an oscillating motion, pot eyes oscillating with said winch and means for traveling said pot eyes to and fro parallel with said winch.

10. An apparatus of the character described having a rotating winch, supporting means therefor capable of oscillatory movement, a pot eye capable of movement parallel with the axis of the winch, and supporting means for the pot eye having pivotal connection with the winch supporting means and capable of oscillatory movement.

11. An apparatus of the character described having a rotating winch adapted for oscillatory movement, supporting means therefor, pivotally mounted pot eye supporting means, a pot eye carried by said last-named supporting means and adapted, during pivotal movement thereof, to traverse the winch in the direction of its axis, said pot eye being also adapted for oscillatory movement in unison with the oscillatory movement of the winch, and means for actuating said pot eye supporting means.

In testimony whereof I have signed my name to this specification in the presence of two subscribing witnesses.

JAMES WILLIAM BANKS.

Witnesses:
HUBERT PUMPHREY,
CHAS. HIBBERT.